(12) United States Patent
Järvenkylä et al.

(10) Patent No.: US 6,203,651 B1
(45) Date of Patent: Mar. 20, 2001

(54) METHOD AND APPARATUS FOR MAKING AN EXTRUSION PRODUCT, AND AN EXTRUSION PRODUCT

(75) Inventors: Jyri Järvenkylä, Hollola; Terho Lahtinen, Helsinki, both of (FI); Michael Sjöberg, Västerås (SE)

(73) Assignee: Uponor Innovation AB, Fristad (SE)

(*) Notice: Subject to any disclaimer, the term of this patent is extended or adjusted under 35 U.S.C. 154(b) by 0 days.

(21) Appl. No.: 09/029,868

(22) PCT Filed: Sep. 20, 1996

(86) PCT No.: PCT/FI96/00502

§ 371 Date: Jun. 22, 1998

§ 102(e) Date: Jun. 22, 1998

(87) PCT Pub. No.: WO97/10940

PCT Pub. Date: Mar. 27, 1997

(30) Foreign Application Priority Data

Sep. 20, 1995 (SE) ................................... 9503272

(51) Int. Cl.⁷ .......................... B29C 47/00; B29C 47/06; B29D 23/00
(52) U.S. Cl. .............................. 156/244.11; 156/244.13; 264/173.12; 264/176.1; 264/209.1; 425/131.1; 425/133.1; 425/133.5; 428/35.7; 428/36.9; 428/36.91
(58) Field of Search ................... 264/563, 565, 264/173.12, 176.1, 209.1; 156/244.13, 244.11; 425/131.1, 133.1, 133.5; 428/35.7, 36.9, 36.91

(56) References Cited

U.S. PATENT DOCUMENTS

| | | | |
|---|---|---|---|
| 3,388,425 | 6/1968 | Detter | 18/13 |
| 4,025,253 | * 5/1977 | Havens | 264/563 |
| 4,059,401 | * 11/1977 | Hanslik | 425/203 |
| 4,113,546 | * 9/1978 | Anders | 156/244.13 |
| 4,266,927 | * 5/1981 | Gilbert et al. | 604/365 |
| 4,640,313 | 2/1987 | Stanley | 138/141 |
| 4,900,572 | * 2/1990 | Repholz et al. | 425/131.1 |
| 5,228,186 | 7/1993 | Brettell et al. | 29/611 |

FOREIGN PATENT DOCUMENTS

| | | |
|---|---|---|
| 2127746 | 1/1995 | (CA). |
| 2051390 | 4/1972 | (DE). |
| 4412799 | 10/1995 | (DE). |
| 0024220 | 2/1981 | (EP). |
| 0317237 | 6/1989 | (EP). |
| 0353977 | 2/1990 | (EP). |
| 0472418 | 2/1992 | (EP). |
| 0507613 | 10/1992 | (EP). |
| 0530507 | 3/1993 | (EP). |
| 0563721 | 10/1993 | (EP). |
| 0571181 | 11/1993 | (EP). |
| 1002523 | 1/1986 | (JP). |
| 3511371 | 10/1986 | (JP). |
| 1114418 | 5/1989 | (JP). |
| 5024109 | 2/1993 | (JP). |
| 8401920 | 5/1984 | (WO). |
| 9002644 | 3/1990 | (WO). |
| 9211125 | 7/1992 | (WO). |
| 9219809 | 11/1992 | (WO). |
| 9421441 | 9/1994 | (WO). |
| 9525626 | 9/1995 | (WO). |

OTHER PUBLICATIONS

Richard, K., et al., Verfestige Rohre Aus Ziegler–Polyäthylen *Kunstoffe*, vol. 50, No. 7, 1960, pp. 371–375.
Derwent's Abstract of JP 50–24109 of Feb., 1993.
Derwent's Abstract of JP 1–114,418 of May, 1998.

* cited by examiner

*Primary Examiner*—Rena L. Dye
(74) *Attorney, Agent, or Firm*—Ladas & Parry

(57) ABSTRACT

An extrusion material is extruded through a tool and a fluoropolymer is between the extrusion material and a surface of the tool for reducing friction between the extrusion material and the surface of the tool. The surface of the tool is of a material with thermal conductivity greater than 30 W/mK.

22 Claims, 3 Drawing Sheets

METHOD AND APPARATUS FOR MAKING AN EXTRUSION PRODUCT, AND AN EXTRUSION PRODUCT

Figure 1:
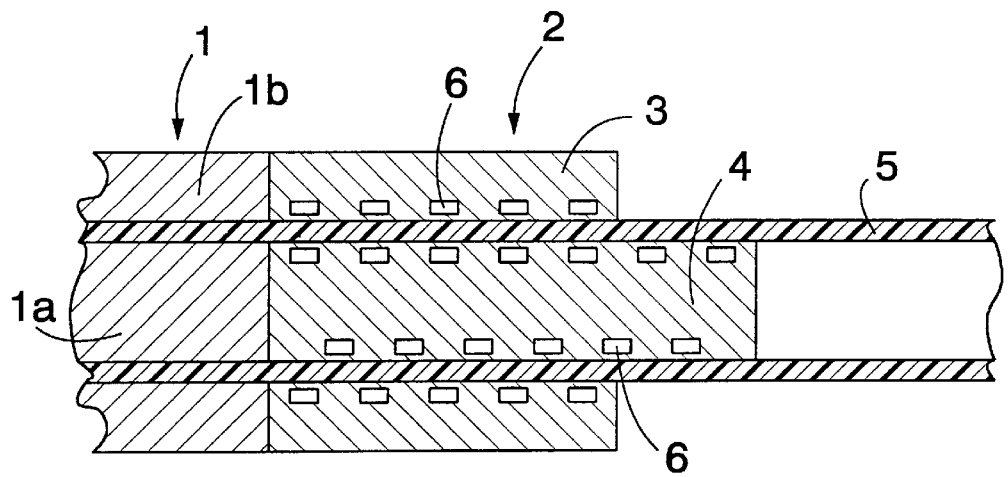

The present invention relates to a method for making an extrusion product, in which method an extrusion material is extruded by an extruder from its extrusion portion through a tool and fluoropolymer is used between the extrusion material and the tool for reducing friction between the extrusion material and the tool.

The present invention further relates to an apparatus for making an extrusion product, which apparatus comprises an extrusion portion for extruding an extrusion material and a tool through which the extrusion material is extruded and fluoropolymer is arranged to be used between the extrusion material and the tool as a slip agent.

The present invention also relates to a product made with the method.

It is essential in the production of crosslinked polyethylene, for example, that the material will flow well against the walls of the tool situated after the screw of the extruder in such a manner that the friction heat generated therein would remain so low that crosslinking cannot start too early. The kinds of polyethylene suitable for producing crosslinked pipes, for example, flow very badly on account of their high molecular weight. On account of low extrusion heat and great viscosity mentioned above, the extrusion process is rather abrupt so that the temperature of the screw and of the cylinder will easily rise too high because of the generated friction heat.

In plastic industry extrusion tools are mainly manufactured of easily machineable hard tool steel or possibly of stainless steel. In order to improve wear resistance required for cleaning processes, for instance, tools are generally chrome plated. EP 0 507 613 discloses that a tool is coated with polytetrafluoroethylene. Polytetrafluoroethylene reduces friction very efficiently and the plastic material will slip steadily along the surface of the tool on account of it. When machining plastics with a high molecular weight, polytetrafluoroethylene will wear off very fast from the surface of the tool during the extrusion process. Therefore it is necessary to halt the extrusion process for adding a new polytetrafluoroethylene layer to the tool. This re-coating has to be carried out even daily. Thus halting the process and starting it again, and wear and addition process of polytetrafluoroethylene will easily raise the costs considerably high. Excessive wear of polytetrafluoroethylene can easily be seen in the final product, too, as the quality of the surface suffers easily. Typically the inner surface of the pipe can become coarse or plastic fluff can be found there. Poor characteristics are not necessarily visible in the outer surface of the pipe, but in microscopic measuring unevenness will become evident.

WO 94/21441 puts forth a solution to the above-mentioned problem where instead of using polytetrafluoroethylene, a layer of a sacrificial thermosetting material is extruded between the extrusion product and the tool. As in most cases the layer will have to be removed from the surface of the product after extrusion, the invention is complicated and difficult to realize.

WO 92/11125 discloses that a slip agent is added to a plastic material. However, if the slip agent is added to a product which has a high molecular weight, for example, and which requires strong machining, it will result in that on account of its slipperiness, the plastic material will easily become disengaged from the screw in melting zone and the plastic material will come out of the extruder unmolten.

The object of the present invention is to provide a method and an apparatus for making an extrusion product where the disadvantages mentioned above can be avoided. A further object is to provide an extrusion product with good characteristics.

The method according to the invention is characterized in that at least the surface of the tool against fluoropolymer is of a material whose thermal conductivity is greater than the thermal conductivity of ordinary tool steel, whereby the friction heat generated can be conducted efficiently away from the interface between the tool and the extrusion material towards the tool.

Further, the apparatus according to the invention is characterized in that at least the surface of the tool against fluoropolymer, at least partly at the smallest cross-section, is of a material whose thermal conductivity is greater than the thermal conductivity of ordinary tool steel.

In addition, the product made with the method according to the invention is characterized in that the surface of the product is essentially smooth without any transverse microscopic stripes repeated at a specific wave length.

The essential idea of the invention is that there is fluoropolymer, such as polytetrafluoroethylene, between the tool and the plastic material to be extruded for reducing friction between the plastic material and the tool and that at least the surface of the tool against fluoropolymer is of a material whose thermal conductivity is greater than the thermal conductivity of ordinary tool steel, whereby the friction heat generated can be conducted fast away from the interface towards the tool. A further idea of one preferred embodiment is that there is a wear resistant coating on the surface of the tool, such as DLC, which comprises pores filled with a fluoro compound, such as polytetrafluoroethylene. The idea of a second preferred embodiment is that there is a slip agent layer essentially comprising a fluoro compound between the coating of the tool and the plastic material. Most preferably the intermediate layer comprises at least partly a fluoro compound, such as fluoro-elastomer, which is supplied into the plastic, and which migrates to abutment surfaces. The idea of a third embodiment is that the fluoro compound forming the slip agent is extruded between the plastic layer and the tool primarily after plastic melting zone just before the nozzle of the tool.

The advantage of the invention is that when at least the surface of the tool is of a material that conducts heat well, the friction heat generated can be conducted efficiently away from the interface of the plastic material to be extruded and the tool, whereby temperature control of the tool will be very good and the temperature will not rise even at the interface too high for polytetrafluoroethylene, for example. It has been unexpectedly found out that by conducting heat away from the interface, the wear resistance of polytetrafluoroethylene, for example, has been considerably improved. In an ordinary tool, although the temperature of the tool is adjusted e.g. to 250° C., polytetrafluoroethylene will wear rather easily from it even though the melting temperature of polytetrafluoroethylene is more than 300° C. Because of friction, the temperature at the interface exceeds the highest temperature allowed for polytetrafluoroethylene, wherefore polytetrafluoroethylene will wear off easily. By means of the method according to the invention, temperature is prevented from rising too high at the interface and thus wear resistance of the tool will improve. DLC is very wear resistant and when its pores are filled with a fluoro compound, the friction between the tool and the plastic material to be extruded will be very small. By forming a slip agent layer between the abutment surfaces of the tool and the plastic material, the material can slip very well along the surface of the tool, but the slip agent layer does not disturb the machining of the actual plastic material, whereby the plastic material may be crosslinked polyethylene that is difficult to machine. By supplying the slip agent between the plastic material to be extruded and the tool primarily after plastic melting zone, the friction heat can also be utilized very efficiently in the melting and machining zone of the actual plastic material.

Figure 2:
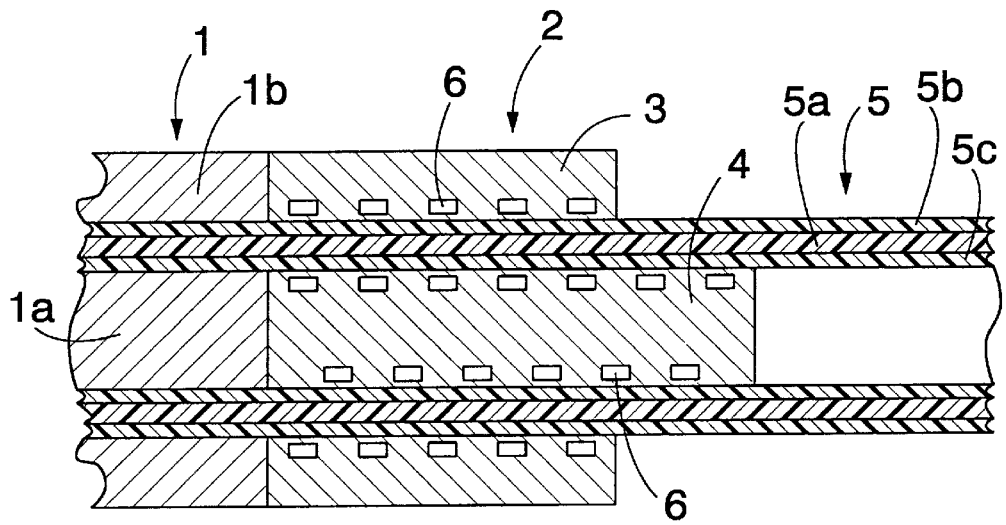
Figure 3:
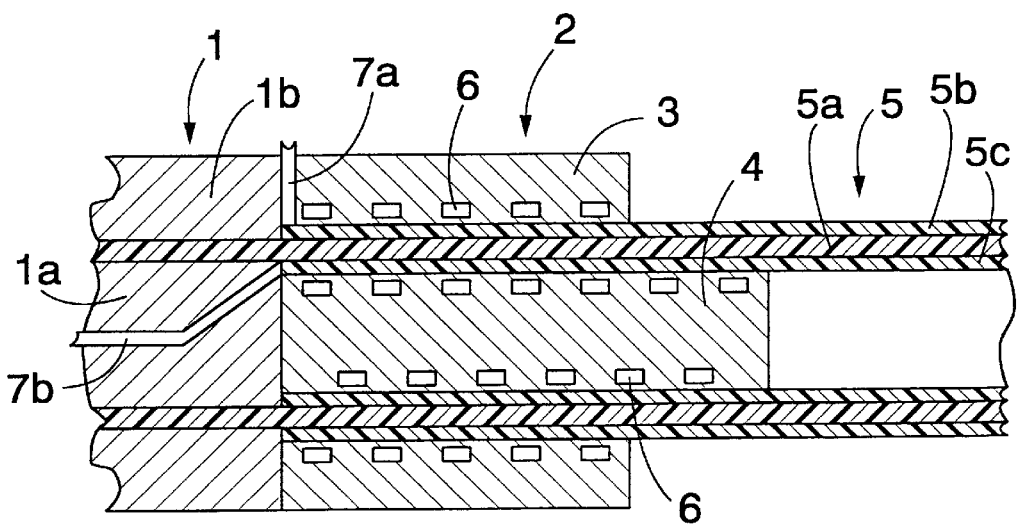
Figure 4A:
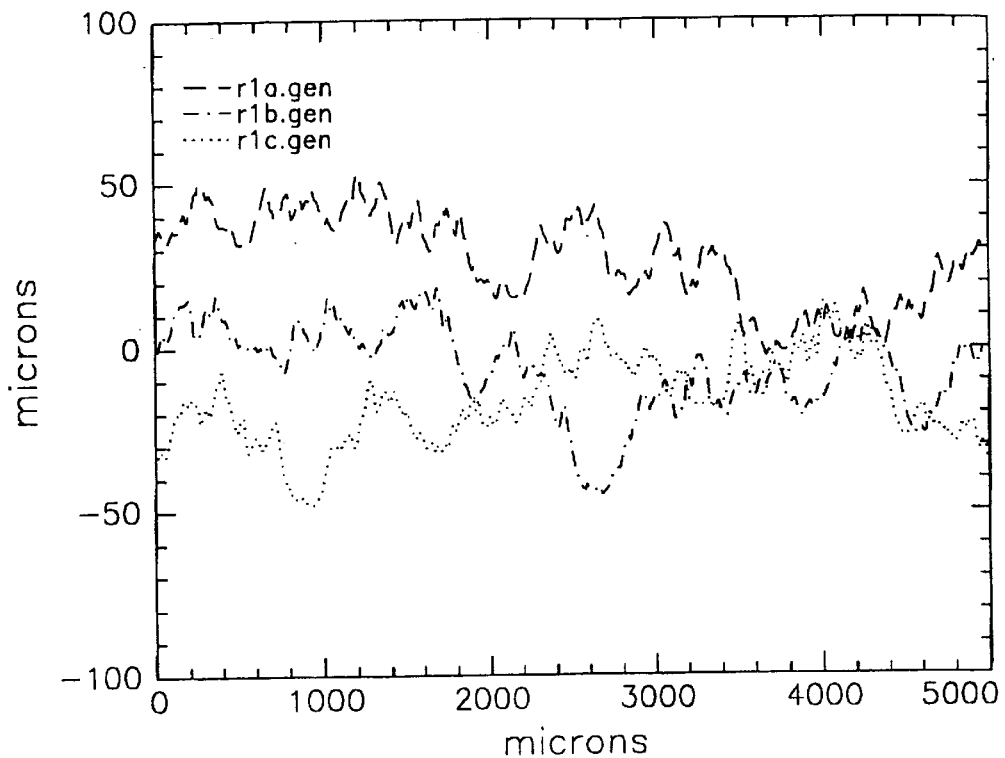
Figure 4B:
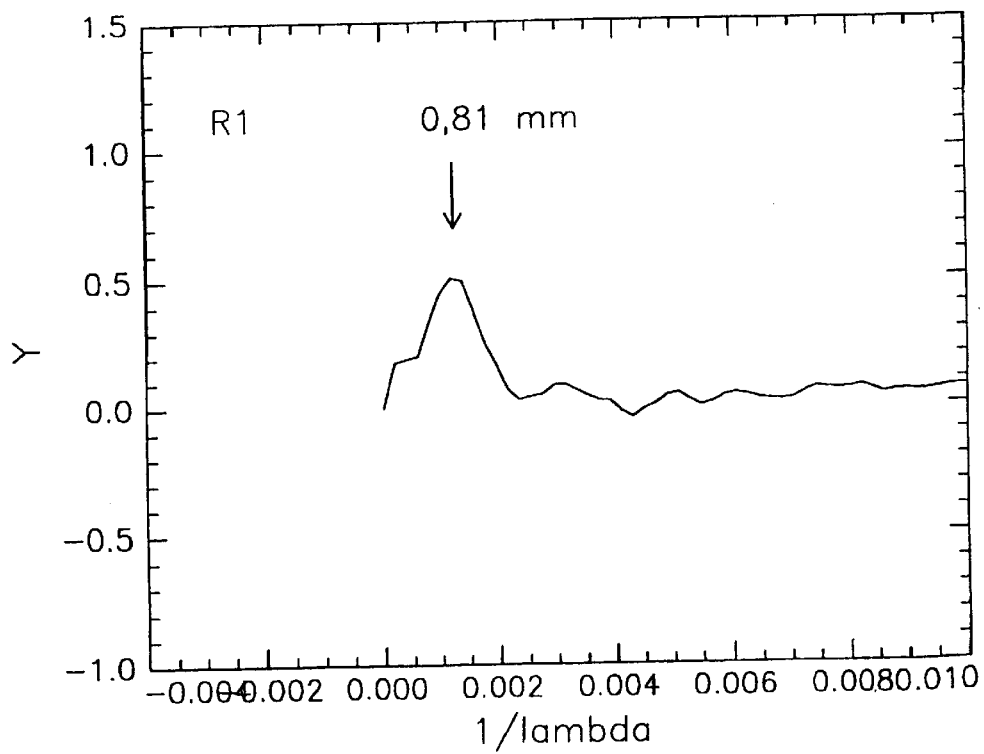
Figure 5A:
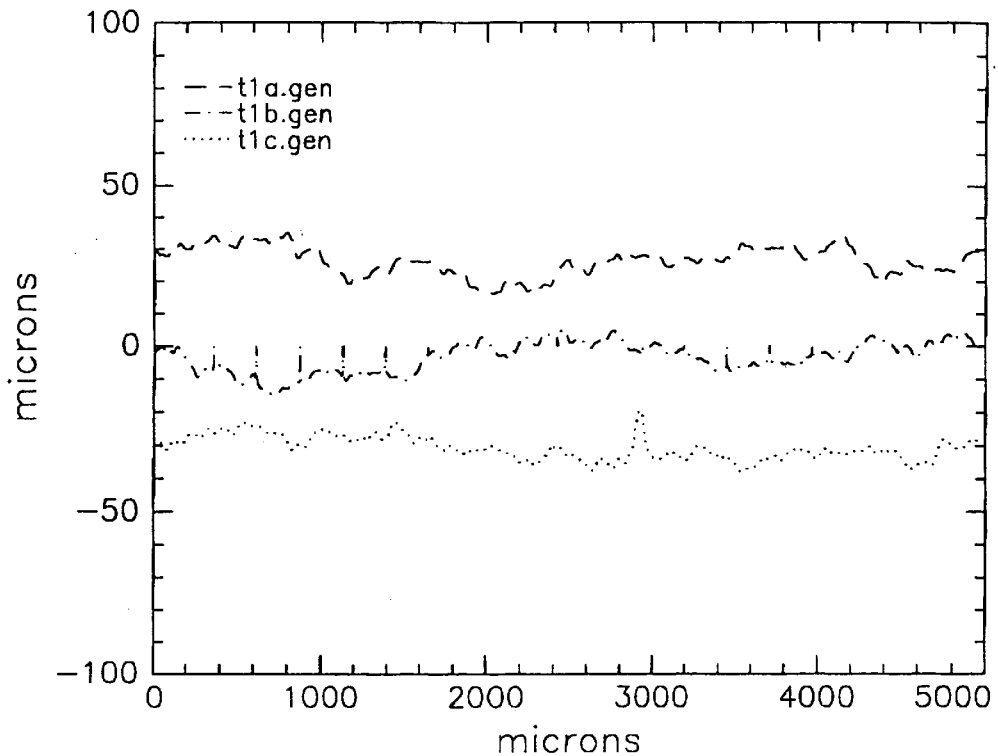
Figure 5B:
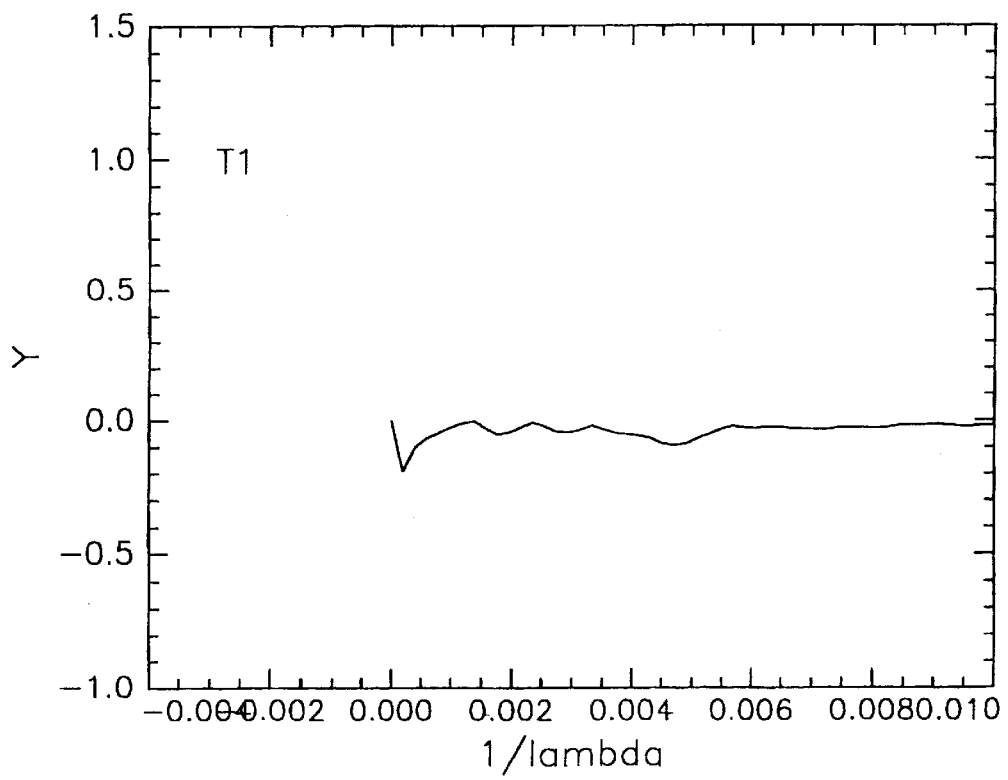

The invention will be explained in more detail in the accompanying drawings, in which FIG. 1 shows a schematic cross-sectional side view of one apparatus according to the invention, FIG. 2 shows a schematic cross-sectional side view of a second apparatus according to the invention, FIG. 3 shows a schematic cross-sectional side view of a third apparatus according to the invention, and FIG. 4a shows a measuring result from the surface of a pipe of an unsatisfactory quality, FIG. 4b illustrates Fourier analysis of the measuring according to FIG. 4a, FIG. 5a shows a measuring result of the surface of a pipe made with the method according to the invention, and FIG. 5b illustrates Fourier analysis of the measuring according to FIG. 5a.

Only the end portion of an extruder portion 1 of an extruder is shown in the appended figure for the sake of clarity in such a manner that the end of a screw portion 1a of the extruder portion 1 and the end of a cylinder portion 1b are visible in the figure. The extruder may be any extruder known per se, an ordinary screw extruder, for example. A tool 2 is arranged to the end of the extruder portion 1. The tool 2 comprises a nozzle outside the extrusion product and a mandrel 4 inside it. The tool 2 can be of any ordinary type, such as a tool having a mandrel carrier provided with a spiral divider, a so-called basket die-head tool having a perforated supporter, a tool having a mandrel carrier secured to the head of a screw, or a so-called crosshead tool. These detailed features have been omitted from the appended figures for the sake of clarity. The extrusion product, a pipe 5 for example, is extruded from between the nozzle 3 and the mandrel 4. The extrusion product can be in addition to the pipe 5 a cable sheath or a film or any such product.

The surfaces of the tool 2 against the plastic material to be extruded are coated with fluoroplastic, most preferably with polytetrafluoroethylene for attaining as good slip characteristics as possible. Before polytetrafluoroethylene is coated, the surfaces of the tool are applied a material whose thermal conductivity is better than that on the other parts of the tool 2 in case the tool 2 is manufactured of tool steel, for example. Thermal conductivity of tool steel is generally about 30 W/mK. Tool steel is easy to machine and also hard enough, thus making it very wear resistant. The coating may be e.g. of beryllium copper alloy whose thermal conductivity is about 200 W/mK or more. By means of this coating, the friction heat caused by friction between the plastic material and the tool 2 may be efficiently conducted away from the interface of the plastic material to be extruded and the tool towards the tool 2. It has also been found in tests that then the temperature at the interface can be dropped as much as 30° C. On account of the dropped temperature, polytetrafluoroethylene does not wear off as fast as in earlier applications. Because of friction heat, temperature at the interface has earlier risen easily too high for polytetrafluoroethylene, even if the tool were cooled at other parts. The tests showed that even a drop of 10° C. in this critical zone reduces wear of polytetrafluoroethylene and thus adds significantly to the service life of the tool. The temperature of the interface can be dropped by using coating, for example, with a thermal conductivity of over 100 W/mK. The tool 2 may also be of a material with a better thermal conductivity than tool steel.

In addition to using a material with good thermal conductivity, the tool can be coated e.g. with a thin chromium polytetrafluoroethylene coating or a so-called diamond like coating (DLC) where the pores are filled with a fluoro compound, such as polytetrafluoroethylene. DLC resists wear very well and the fluoro compound, which fills the pores, reduces friction between the plastic material and the tool 2.

The nozzle 3 has a unit 6 provided with oil circulation, for example. A similar unit 6 has also been arranged to the mandrel 4. By means of the units 6, the temperature of the nozzle 3 and the mandrel 4 can be controlled as required by passing heat thereto or removing it therefrom.

The method and the apparatus according to the invention is in principle suitable for all extrusion that requires accurate adjustment of temperature and good slip characteristics. For example, in the drive of polyethylene foam, very low temperatures have to be used and because of exothermic reaction, heat has to be removed efficiently from the process. In orientation processes, for example, a typical melt flow causes disturbances in the actual orientation stage of molecules and thus it is preferable that the friction between the plastic material and the tool is reduced with polytetrafluoroethylene. High temperature is a particular problem especially when making crosslinked polyethylene pipes. It is especially difficult to use a material with a high molecular weight for making the product. The method and the apparatus according to the invention is also suitable to be used for materials whose average molecular weight is more than 200,000 g/mol.

FIG. 2 shows a schematic cross-sectional side view of a second apparatus according to the invention. The numbers in FIG. 2 correspond to those of FIG. 1. The extruder according to FIG. 2 produces a three-layered product whose outer layer 5b and inner layer 5c preferably form a slip agent layer comprising essentially fluoroplastic, such as polytetrafluoroethylene. Because of these slip agent layers, the extrusion material slips very well along the surface of the tool 2. The coating on the surface of the tool 2, which conducts heat well, causes extra heat to be led efficiently away from the interface, whereby the highest allowed temperature sustainable for the used fluoroplastic will not be exceeded. More preferably, the outer layer 5b and the inner layer 5c comprise at least partly a fluoro compound, such as fluoroelastomer, which is supplied into the plastic, and which migrates to the abutment surfaces of the tool 2 and reduces friction. Differing from the appended figure, the outer layer 5b and the inner layer 5c can be considerably thinner than the middle layer 5a, whereby they form an outer skin and inner skin of the pipe 5. Therefore the slip agent can only be used for thin skins and the effect of the slip agent does not disturb the machining of the material in a middle layer 5a. The middle layer 5a may be crosslinked polyethylene that is difficult to machine.

FIG. 3 shows a schematic cross-sectional side view of a third apparatus according to the invention. The numbers in FIG. 3 correspond to those of FIGS. 1 and 2. The extruder contains a first supply channel 7a and a second supply channel 7b, by means of which the outer layer 5b and the inner layer 5c can be supplied to the outside and inside of the middle layer 5a of the extrusion material. The supply channels 7a and 7b are arranged to supply a slip agent layer containing fluoroelastomer or fluoroplastic to the outside and inside of the extrusion material just before the tool 2. In that case, the middle layer 5a can be melted and machined in the extruder portion 1 by using the effect of friction heat very efficiently, as the slip agent layers are supplied to the extruder after plastic melting zone. in FIG. 3 the second supply channel 7b is arranged inside the feed screw but it can also be arranged to supply the material from outside through the middle layer 5a. However, forming of a joining seam can be avoided by the solution of FIG. 3.

In case the flow of the extrusion material changes so that pure friction flow changes in part into melt flow, transverse stripes are formed in the product, that is, a pattern repeated regularly at distances from about less than a millimetre to some millimetres can be detected in the product. This pattern may not necessarily be visible. In microscopic measurings these transverse stripes can be detected. When handling measuring result mathematically by Fourier analysis, it has been detected that unevenness occurs at regular distances, the distance generally varying between from about less than one millimetre to some millimetres. The method and apparatus of the invention makes the extrusion product slip evenly on the surface of the tool, wherefore unevenness cannot be seen essentially on the surface of the extrusion product.

FIG. 4a shows a result of a microscopic measuring from a surface of an unsatisfactory pipe. On X axle the outer surface of the pipe is on a profilometer and the coarseness of the pipe is on Y axle. The unevenness visible in the figure is not necessary visible for the naked eye, but as can be seen in the appended figure, unevenness can be clearly detected in microscopic measuring.

FIG. 4b shows a Fourier analysis of measuring according to FIG. 4a. Sequentiality of unevenness can be clearly detected in the Fourier analysis, a sequence being 0.81 mm at wave length. Finding a specific wave length proves that the flow of the plastic material is not steady, but pure friction flow has partly changed into melt flow.

FIG. 5a shows a microscopic measuring of a pipe made with the method according to the invention. It can be seen in FIG. 5a that the surface has been fairly even. A Fourier analysis shown in FIG. 5b is also made of the measuring of FIG. 5a and it proves that now sequential unevenness cannot be detected.

The drawing and the specification related thereto are only intended to illustrate the idea of the invention. In its details the invention may vary within the scope of the claims.

What is claimed is:

1. In a method in which an extrusion material is extruded through a tool (2) and a fluoropolymer is between the extrusion material and a surface of the tool (2) for reducing friction between the extrusion material and the surface of the tool, the improvement wherein:
   at least the surface of the tool (2) is of a material with thermal conductivity greater than the thermal conductivity of tool steel.

2. A method according to claim 1, characterized in that the temperature of the tool is adjusted as required.

3. A method according to claim 1, characterized in that:
   the extrusion material has at least two layers respectively closest to and farthest from the surface of the tool (2);
   the layer closest to the surface of the tool (2) comprises at least partly the fluoropolymer; and
   the fluoropolymer migrates to the surface of the tool (2).

4. A method according to claim 3, characterized in that:
   the layer farthest from the surface of the tool comprises at least partly a fluoro compound which migrates to another surface of the tool; and
   a middle layer (5a) of the extrusion material does not contain a fluoro compound.

5. A method according to preceding claim 1, characterized in that:
   the fluoropolymer contains a fluoroelastomer or fluoroplastic; and
   the fluoropolymer is extruded between the extrusion material and the tool (2) before the extrusion material and fluoropolymer enter the tool (2).

6. A method according to claim 1, characterized in that the extrusion material is a plastic with an average molecular weight of more than 200,000 g/mol.

7. A method according to claim 1, characterized in that the extrusion material is a crosslinked polyethylene.

8. A product made with the method according to claim 1, characterized in that the surface of the product is essentially smooth without transverse microscopic stripes repeated at a specific wave length.

9. A product according to claim 8, characterized in that the product is a pipe (5) comprising at least three layers (5a, 5b, 5c), whereby at least the outer and inner layers (5b, 5c) comprise a slip agent containing a fluoro compound.

10. A product according to claim 9, characterized in that thin skins form the outer and inner layer (5b, 5c).

11. A product according to claim 9, characterized in that the middle layer (5a) comprises a material whose average molecular weight is more than 200,000 g/mol.

12. A product according to claim 11, characterized in that the middle layer (5a) primarily comprises essentially crosslinked polyethylene that does not contain a slip agent.

13. In an apparatus for extruding an extrusion material, the improvements comprising:
   a tool (2) through which the extrusion material is extruded with a fluoropolymer between the extrusion material and a surface of the tool (2) as a slip agent,
   wherein at least part of the surface of the tool (2) is at a smallest cross section of the tool and of a material with a thermal conductivity greater than the thermal conductivity of tool steel.

14. An apparatus according to claim 13, and further comprising a unit (6) for controlling the temperature of the tool (2).

15. An apparatus according to claim 13, characterized in that at least in one place the surface of the tool comprises a chrome polytetrafluoroethylene coating or DLC with pores filled with a fluoro compound.

16. An apparatus according to claim 13, and further comprising means for extruding the slip agent before the extrusion material is extruded through the tool (2).

17. An apparatus according to claim 13, characterized in that the thermal conductivity is greater than 100 W/mK.

18. An apparatus according to claim 17, characterized in that at least the part of the surface of the tool (2) is of a beryllium copper alloy with a thermal conductivity of more than 200 W/mK.

19. In a method in which an extrusion material is extruded through a tool (2) and a fluoropolymer is between the extrusion material and a surface of the tool (2) for reducing friction between the extrusion material and the surface of the tool, the improvement wherein:
   at least the surface of the tool (2) is of a material with thermal conductivity greater than 30 W/mK.

20. A method according to claim 19, characterized in that the thermal conductivity is greater than 100 W/mK.

21. A method according to claim 20, characterized in that the thermal conductivity is greater than 200 W/mK.

22. A method according to claim 21, characterized in that at least the surface of the tool (2) is beryllium copper alloy.

\* \* \* \* \*

UNITED STATES PATENT AND TRADEMARK OFFICE
CERTIFICATE OF CORRECTION

PATENT NO. : 6,203,651 B1                                  Page 1 of 1
DATED     : March 20, 2001
INVENTOR(S) : Jyri Jarvenkyla, et al.

It is certified that error appears in the above-identified patent and that said Letters Patent is hereby corrected as shown below:

<u>Title page,</u>
Item [30], after "9503272" insert -- Jun. 26, 1996 PCT EP96/02801 -- .

Signed and Sealed this

Sixteenth Day of October, 2001

Attest:

NICHOLAS P. GODICI
Attesting Officer     *Acting Director of the United States Patent and Trademark Office*